United States Patent
Song et al.

(10) Patent No.: US 7,184,131 B2
(45) Date of Patent: Feb. 27, 2007

(54) MULTIFUNCTION RANGEFINDER

(75) Inventors: Peng-Fei Song, Hang-zhou (CN);
Chih-Wei Hung, Taichung Hsien (TW);
Pi-Yao Chien, Taichung Hsien (TW);
Kuo-Hua Yang, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 299 days.

(21) Appl. No.: 10/912,358

(22) Filed: Aug. 5, 2004

(65) Prior Publication Data

US 2005/0185168 A1 Aug. 25, 2005

(30) Foreign Application Priority Data

Feb. 25, 2004 (TW) ............................. 93104744 A

(51) Int. Cl.
*G01C 3/08* (2006.01)
(52) U.S. Cl. .................. 356/4.01; 356/4.02; 356/4.03; 356/5.01
(58) Field of Classification Search ................ 356/4.01
See application file for complete search history.

(56) References Cited

U.S. PATENT DOCUMENTS 5,798,733 A * 8/1998 Ethridge ................. 342/357.08
6,310,682 B1 * 10/2001 Gavish et al. ............. 356/5.01

* cited by examiner

*Primary Examiner*—Thomas H. Tarcza
*Assistant Examiner*—Luke D. Ratcliffe
(74) *Attorney, Agent, or Firm*—Thomas, Kayden, Horstemeyer & Risley

(57) ABSTRACT

A multifunction rangefinder capable of measuring distance, compass location and altitude. A distance measurement unit capable of long and short distance measurements transmits a light beam to a target, receives a reflected light from the target and outputs a distance measurement signal. A compass measurement unit measures terrestrial magnetism and outputs a compass measurement signal. An altitude measurement unit measures atmospheric pressure to generate an altitude measurement signal. A microprocessor calculates a distance between the target and the multifunction rangefinder, altitude and the compass location of the target according to the distance, altitude and compass measurement signals respectively.

11 Claims, 7 Drawing Sheets

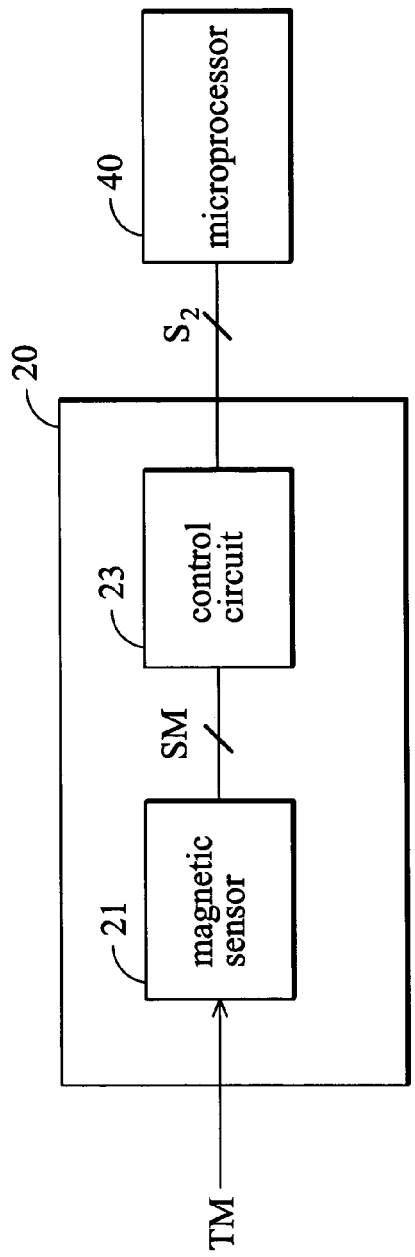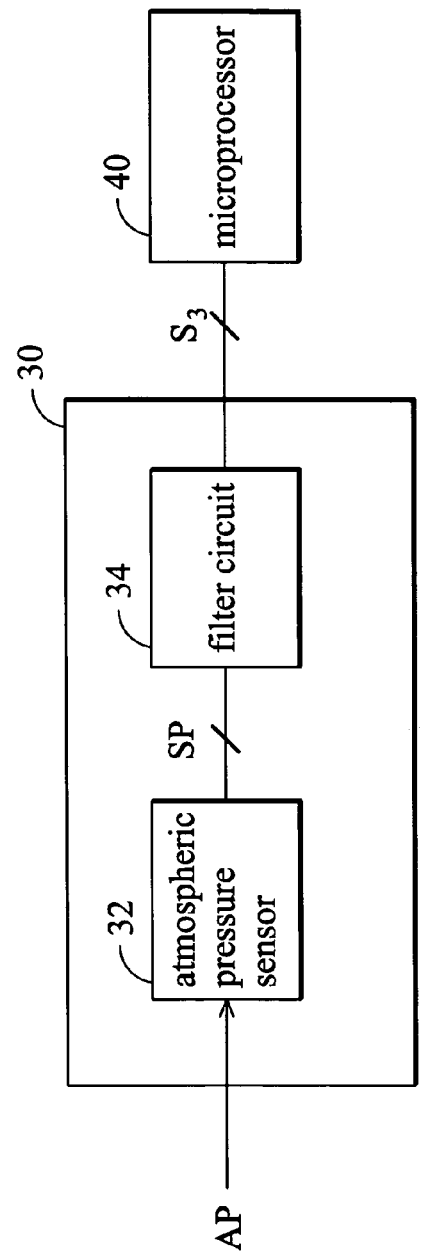

MULTIFUNCTION RANGEFINDER

BACKGROUND

The present invention relates to a kind of rangefinders, and more particularly, to a multifunction rangefinder capable of measuring distance, compass location and/or altitude.

In conventional pulse laser rangefinders, current noise is produced during measurement. After conversion to time domain, the location of the current noise is 7~10 meters from the rangefinder such that noise and true signals cannot be differentiated within 10 meters. To address this problem, small signal noise can be eliminated using a high reference voltage level provided by a single comparator. However, this method also eliminates the small signal pulse needed for long-distance measurement, such that a distant target cannot be measured.

SUMMARY

For this reason, this invention provides a multifunction rangefinder which is capable of measuring distance, compass location and altitude. This kind of multifunction rangefinder comprises a power supply, a distance measurement unit, a compass measurement, an altitude measurement unit and a microprocessor. The distance measurement unit is coupled to a power supply to transmit a light beam to a target, receive a reflected light beam from the target and output a distance measurement signal. The distance measurement unit measures short distance targets in a comparison mode and measures long distance targets in a gain mode. A compass measurement unit coupled to the power supply measures terrestrial magnetism to provide a compass measurement signal. An altitude measurement unit coupled to the power supply measures atmospheric pressure to output an altitude measurement signal. A microprocessor calculates a distance between the target and the multifunction rangefinder and a present altitude according to the distance measurement signal and the altitude measurement signal respectively and determines a compass location of the target according to the compass measurement signal. A display unit coupled to the microprocessor displays the calculated distance between the target and the multifunction rangefinder, the calculated altitude and compass location of the target.

BRIEF DESCRIPTION OF THE DRAWINGS

The present invention can be more fully understood by the subsequent detailed description and examples with reference made to the accompanying drawings, wherein:

FIG. 4 is a block diagram of an embodiment of a compass measurement unit;

FIG. 5 is block diagram of an embodiment of an altitude measurement unit;

DETAILED DESCRIPTION

Figure 1:
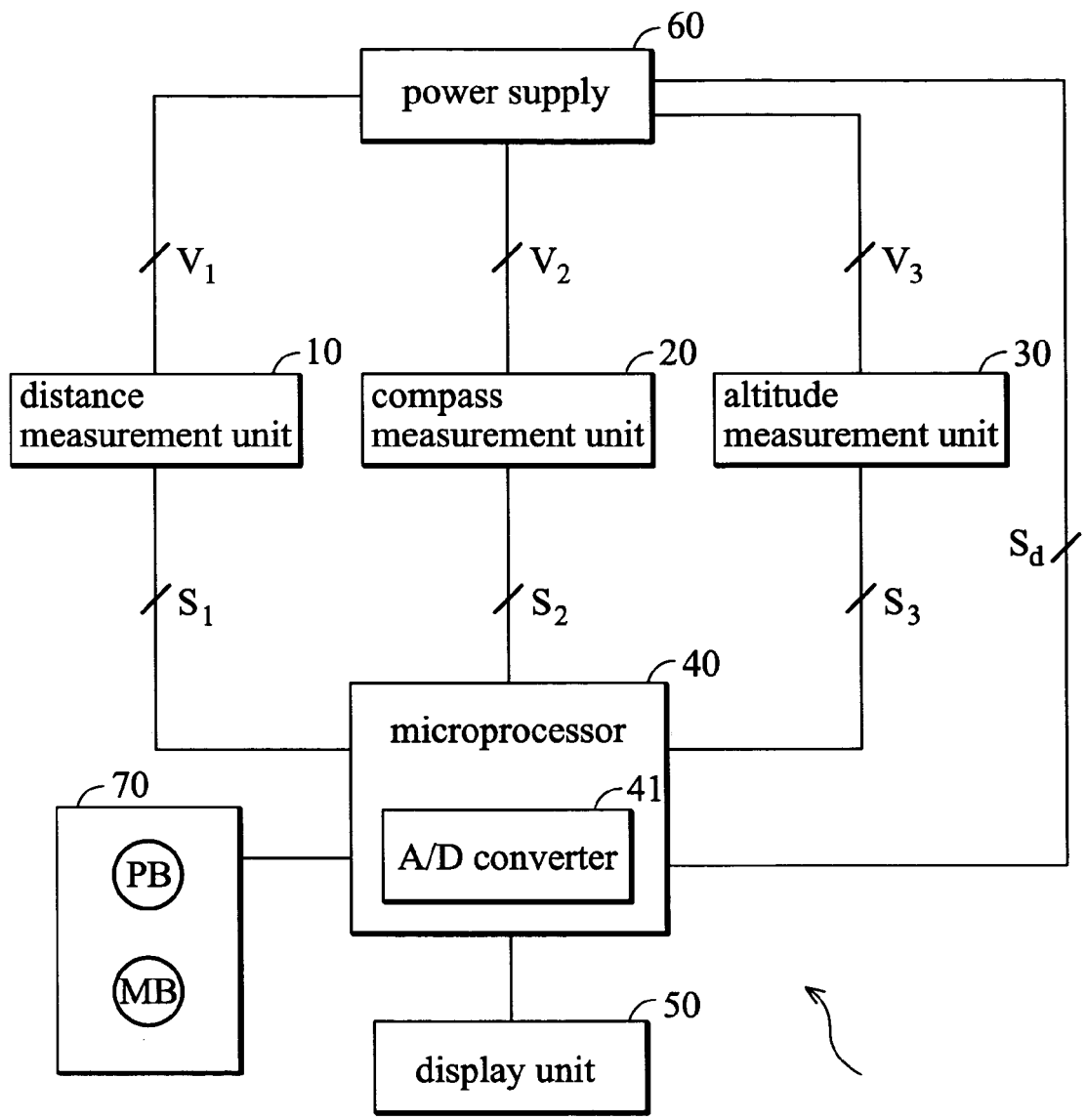
FIG. 1 is a block diagram of an embodiment of a multifunction rangefinder.

FIG. 1 is a block diagram of an embodiment of a multifunction rangefinder. As shown in FIG. 1, the multifunction rangefinder 100 comprises a distance measurement unit 10, a compass measurement unit 20, an altitude measurement unit 30, a microprocessor 40, a display unit 50, a power supply 60 and an interface unit 70.

The power supply 60 powers the distance measurement unit 10, the compass measurement unit 20, the altitude measurement unit 30, the microprocessor 40, the display unit 50 and the interface unit 70. The power supply 60 provides a plurality of different power voltages required by the distance measurement unit 10, the compass measurement unit 20, the altitude measurement unit 30, the microprocessor 40, the display unit 50 and the interfacing unit 70. For example, the power supply 60 may provides first, second and third power voltages to power the distance measurement unit 10, the compass measurement unit 20, and the altitude measurement unit 30 respectively.

In the embodiment of FIG. 1, the interfacing unit 70 comprises a first control (PB), such as a power control, and a second control, such as a mode control (MB). According to signals produced by the controls PB and MB, the microprocessor 40 outputs a power selection signal $S_d$ to the power supply 60 to selectively power the distance measurement unit 10, the compass measurement unit 20 or the altitude measurement unit 30 with voltages $V_1$, $V_2$ and $V_3$, respectively. The voltages can cause the units 10, 20 and 30 to execute corresponding measurements simultaneously, independently, or in any combination according to the power selection signal $S_d$ from the microprocessor 40.

Distance measurement unit 10 is coupled to the microprocessor 40 to execute a distance measurement when powered by first voltage $V_1$ supplied by power supply 60. When initiated, distance measurement unit 10 transmits a light beam to a target (not shown), receives a reflected light beam from the target and outputs a distance measurement signal $S_1$ to the microprocessor 40.

Figure 2:
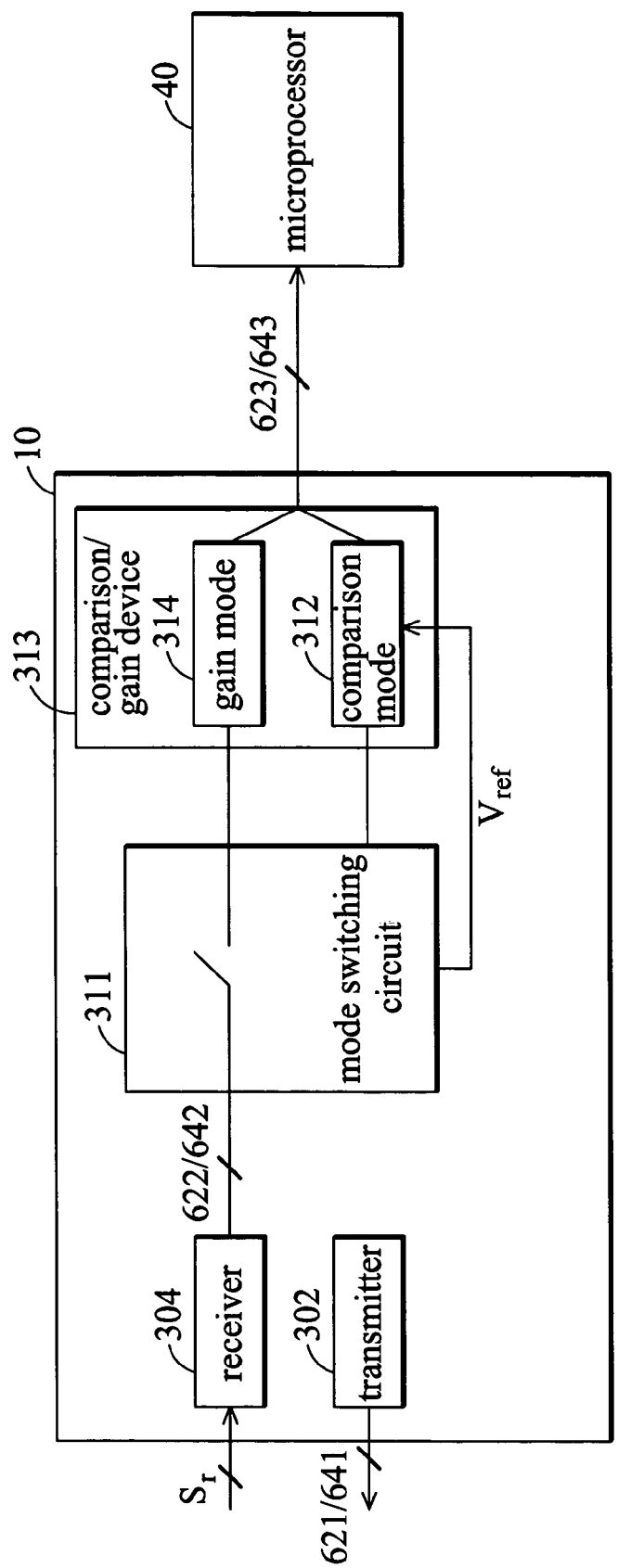
FIG. 2 is a block diagram of an embodiment of a distance measurement unit in the rangefinder.

FIG. 2 is a block diagram of an embodiment of distance measurement unit. As shown in FIG. 2, the distance measurement unit 10 comprises a transmitter 302, a receiver 304, a mode switching circuit 311 and a comparison/gain device 313. The transmitter 302 transmits pulse light beams 621/641 to a target (not shown), and the target reflects the pulse light beams. The receiver 304 receives the reflected pulse light beams $S_r$, and outputs corresponding distance signals 622/642 to the comparison/gain device 313 through the mode switching circuit 311. The comparison/gain device 313 processes the distance signal 622 in a comparison mode 312 and processes the distance signal 642 in a gain mode 314. The comparison mode 312 and the gain mode 314 are selectively switched by the mode switching circuit 311.

Initially, the distance measurement unit 10 assumes that the distance between the target and the multifunction rangefinder 10 is within 30 meters. The mode switching circuit 311 sets the comparison/gain device 313 to operate in the comparison mode 312, and provides a reference voltage $V_{ref}$ to the comparison/gain device 313. Thus, the distance signal output 622 from the receiver 304 is transferred to the comparison/gain device 313 operating in the comparison mode 312 through the mode switching circuit 311. The mode switching circuit 311 enables comparison/gain device 313 to operate in a gain mode 314 and process the distance signal 642 output from the receiver 304 when the distance between the rangefinder and the target cannot be measured in the comparison mode.

During operation in comparison mode 312, the mode switching circuit 311 provides a reference voltage $V_{ref}$ to the comparison/gain device 313. The reference voltage level $V_{ref}$ is slightly higher than spike noise. The spike noise is produced when a pulse signal is transmitted from the transmitter 302. The comparison/gain device 313 receives the distance signal output 622 from the receiver 304, and cuts off signals with level lower than the reference voltage $V_{ref}$.

Consequently, the spike noise can be eliminated by the comparison/gain device 313.

Figure 3A:
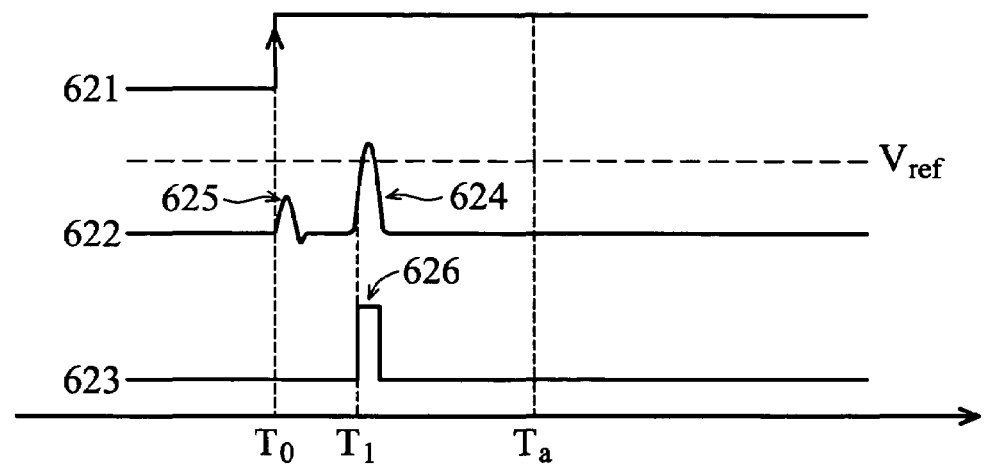
FIG. 3a is a timing chart output from the comparison/gain device of the distance measurement unit of FIG. 2.

FIG. 3a is a timing chart output from the comparison/gain device 313 of FIG. 2. As shown in FIG. 3a, the signal 621 is a pulse signal transmitted to the target from the transmitter 302 at time $T_0$. The distance signal 622 has a spike noise 625 after time $T_0$. The comparison/gain device 313 receives the distance signal 622 and outputs the signal 623. The signal 623 is the output wave of the comparison/gain device 313 after receiving the distance signal 622. The pulse light beam reflected from the target can maintain considerable energy intensity if the distance between the target and the rangefinder is within 30 meters. Thus, the distance signal 622 output from the receiver 304 may have a target pulse 624 higher than the reference voltage level $V_{ref}$. In the comparison mode 312, pulses smaller than the reference voltage level $V_{ref}$ can be eliminated by the comparison/gain device 313 when the distance between the target and the rangefinder is within 30 meters. Consequently, the signal 623 only includes pulse 624 without spike noise 625.

Initially, the mode switching circuit 311 enables the comparison/gain device 313 to operate in comparison mode 312 and outputs the signal 623 to the microprocessor. Consequently, the microprocessor determines whether a pulse light beam reflected from the target is received by the receiver 304 during time $T_a$, and calculates the distance between the target and the rangefinder. Thus, the microprocessor calculates the distance traveled by the light beam between the target and the multifunction rangefinder 10 according to the pulse 626 in the signal 623, as the distance measurement signal S1, from the comparison/gain device 313.

Figure 3B:
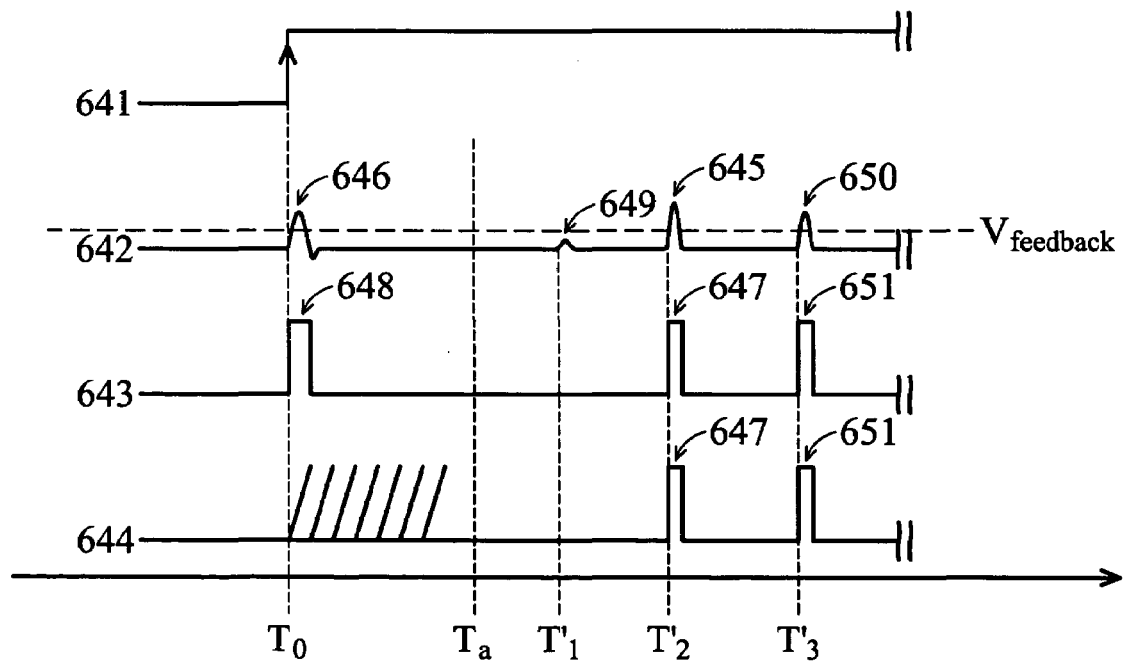
FIG. 3b is another timing chart output from the comparison/gain device of the distance measurement unit of FIG. 2.

The microprocessor enables the comparison/gain device 313 to operate in a gain mode 314 when the comparison/gain device 313 has no output or the microprocessor 40 cannot obtain the distance between the target and the multifunction rangefinder 100. In the gain mode 314, the comparison/gain device 313 has a feedback voltage level $V_{feedback}$, wherein the feedback voltage level $V_{feedback}$ is provided from the output of the comparison/gain device 313, and the feedback voltage level $V_{feedback}$ is smaller than the reference voltage level $V_{ref}$. The comparison/gain device 313 gains the pulses therethrough non-linearly in the gain mode 314. FIG. 3b is a timing chart output from the embodiment of the comparison/gain device 313 of FIG. 2. The travel time of the pulse light beam between the target and the rangefinder exceeds time $T_a$ if the distance between the target and the rangefinder exceeds 30 meters. As shown in FIG. 3b, the signal 641 is a pulse signal transmitted to the target from the transmitter 302 at time $T_0$. The distance signal 642 has a spike noise 646 in the proximity of time $T_0$, and pulses 649, 645 and 650 occur in the distance signal at time $T'_1$, $T'_2$ and $T'_3$ consecutively. The pulse 649 is eliminated by the comparison/gain device 313 because the peak voltage of the pulse 649 is smaller than the feedback voltage level $V_{feedback}$ when the distance signal 642 passes through the comparison/gain device 313. The pulses 645, 650 and the spike noise 646 are amplified non-linearly by the comparison/gain device 313. The comparison/gain device 313 receives the distance signal 642 and outputs the signal 643. Namely, the signal 643 is the output wave of the comparison/gain device 313 after receiving the distance signal 642. Square waves 648, 647 and 651 are amplifications of the spike noise 646 and the pulses 645 and 650, wherein the square waves 648, 647 and 651 have the same peak voltage level. The signal 643 output from comparison/gain device 313 is transferred to the microprocessor 40 for calculation of the distance between the target and the rangefinder. In this embodiment, the microprocessor 40 accumulates the amplified signal 643 corresponding to the pulse light beams by statistical operation so as to distinguish between the pulse light beam reflected from the target and environmental light. During the statistical operation, the microprocessor 40 eliminates the square wave produced before time Ta automatically, such as square wave 648, and calculates the signal 644. Thus, the microprocessor 40 calculates the distance traveled by the light beam between the target and the multifunction rangefinder 10 according to the signal 644, as the distance measurement signal, from the comparison/gain device 313.

The compass measurement unit 20 is coupled to the microprocessor 40 to execute a compass measurement when powered by second voltage $V_2$ supplied by power supply 60. When initiated, the compass measurement unit 20 measures terrestrial magnetism TM to generate a compass measurement signal $S_2$ output to the microprocessor 40. FIG. 4 is a block diagram of an embodiment of a compass measurement unit 20. As shown, the compass measurement unit 20 comprises a magnetic sensor 21 and a control circuit 23. The magnetic sensor 21 senses the terrestrial magnetism and outputs a first corresponding signal SM, and the control circuit 23 converts the first corresponding signal SM to the compass measurement signal $S_2$ which is output to the microprocessor 40. Consequently, the microprocessor 40 determines the compass location of the target according to the compass measurement signal $S_2$. For example, the compass location of the target can be the azimuth between the target and true north.

The altitude measurement unit 30 is coupled to the microprocessor 40 to execute an altitude measurement when powered by third voltage $V_3$ supplied by power supply 60. When initiated, the altitude measurement unit 30 measures atmospheric pressure (AP) to provide an altitude measurement signal $S_3$ to the microprocessor 40. FIG. 5 is a block diagram of an embodiment of the altitude measurement unit 30. This embodiment of the altitude measurement unit 30 comprises an atmospheric pressure sensor 32 and a filter circuit 34. The atmospheric pressure sensor 32 senses atmospheric pressure AP and outputs a second corresponding signal SP. The filter circuit 32 filters noise from the second corresponding signal SP and outputs an output signal as the altitude measurement signal $S_2$ to microprocessor 40.

The microprocessor 40 is coupled to the distance measurement unit 10, the compass measurement unit 20, the altitude measurement unit 30, the display unit 50, the power supply 60 and the interface unit 70. The microprocessor 40 outputs a power selection signal $S_d$ to determine power voltages output from the power supply 60 according to signals produced by the interface unit 70. The microprocessor 40 calculates the distance traveled by the light beam between the target and the multifunction rangefinder 10 according to the distance measurement signal S1 from the distance measurement unit 10. Further, the microprocessor 40 determines the compass location of the target according to the compass measurement signal $S_1$ from the compass measurement unit 20. Furthermore, the microprocessor 40 calculates altitude according to the altitude measurement signal S3 from the altitude measurement unit 30. In this case, the microprocessor 40 comprises an analog-to-digital converter 41 to sample the altitude measurement signal S3 and output a sampled signal, which is used by microprocessor 40 to calculate altitude. In addition, the microprocessor further comprises a timer to automatically shut down the multifunction rangefinder 100.

The display unit 50 is coupled to the microprocessor 40 to display distance, altitude and compass location of the target. The display unit 50 can, for example, be an LCD display.

Figure 6:
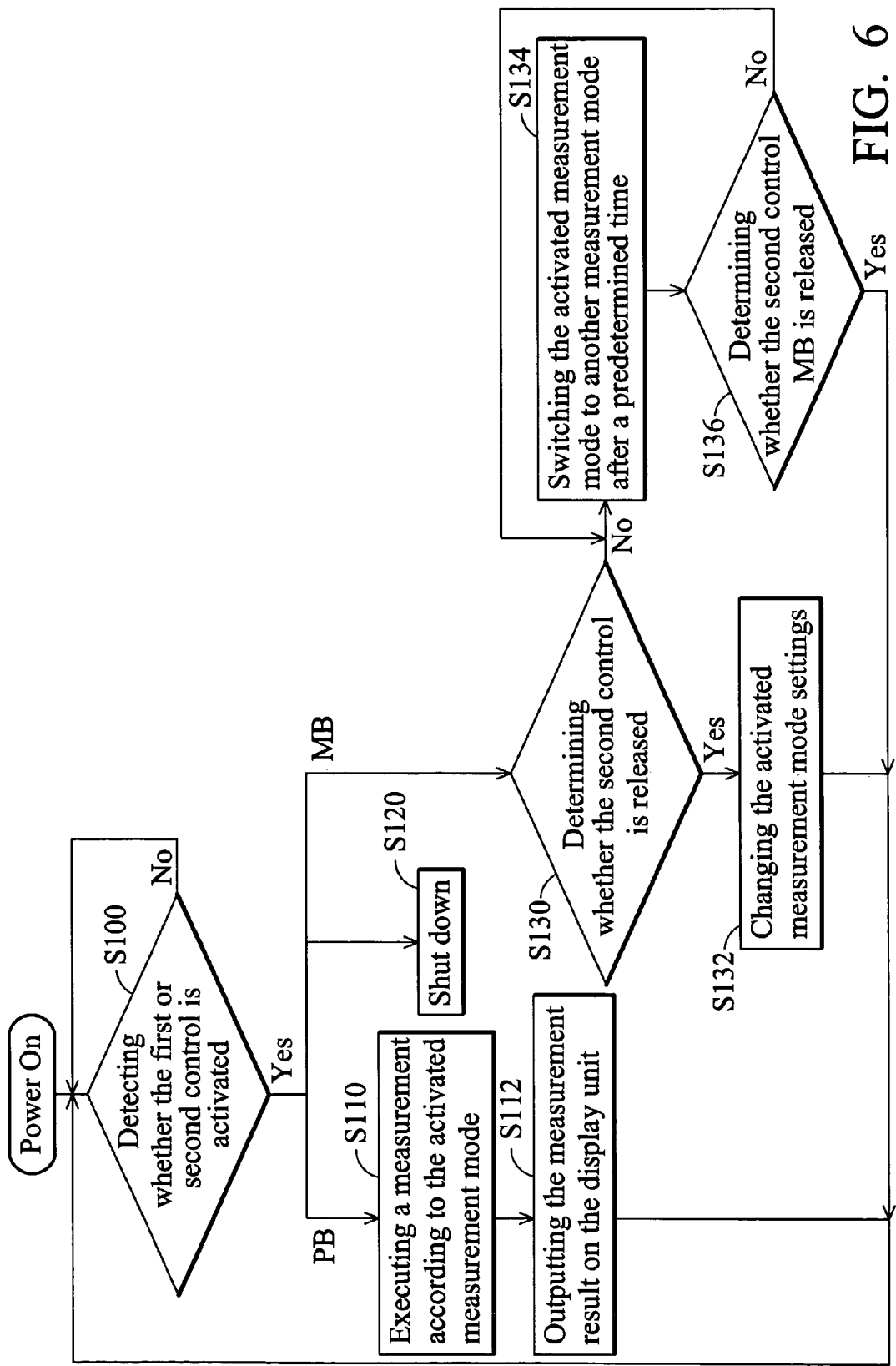
FIG. 6 is a flowchart of operation of an embodiment of a multifunction rangefinder.

FIG. 6 is a flowchart of operation of an embodiment of the multifunction rangefinder.

After the rangefinder 10 is powered on, the microprocessor 40 shows the present measurement mode, such as a distance, compass location, or an altitude measurement mode on the display unit 50. The measurement unit corresponding to the selected measurement mode is not powered until control PB is activated. When the first control PB is activated, microprocessor 40 executes a measurement according to the activated measurement mode, outputting the power selection signal Sd to the power supply 60 to output a corresponding voltage to the corresponding measurement unit, such as the distance measurement unit 10, the compass measurement unit 20 or the altitude measurement unit 30. In step S112, the microprocessor 40 outputs the measurement result on the display unit 50. If no controls are activated in the step S100, the microprocessor 40 shuts down the multifunction rangefinder in step S120.

If the microprocessor 40 determines that the second control (mode control) MB is activated in step S100, step S130 is then executed, wherein microprocessor 40 determines whether the second control MB is released, and, if so, step S132 is executed, wherein the microprocessor 40 changes the activated measurement mode settings. For example, if the activated measurement mode is distance measurement, the settings of the present measurement mode comprise a long distance mode, a short distance mode, and a unit displaying the measured distance or others.

Step S134 is executed when, in step S130, the microprocessor 40 determines that the second control MB is released, wherein the microprocessor 40 waits a predetermined time, such as 500 ms, then switches the activated measurement mode to another measurement mode. For example, if the activated measurement mode is the distance measurement mode, the microprocessor 40 switches to the compass measurement mode.

Next, in step S136, the microprocessor 40 determines whether the second control MB is released. If so, the process returns to step S100. If the second control is not released, the process returns to step S134. In some embodiment, the distance, compass, and altitude measurements can be executed simultaneously and all measured results can be displayed on the display unit 50.

Figure 7:
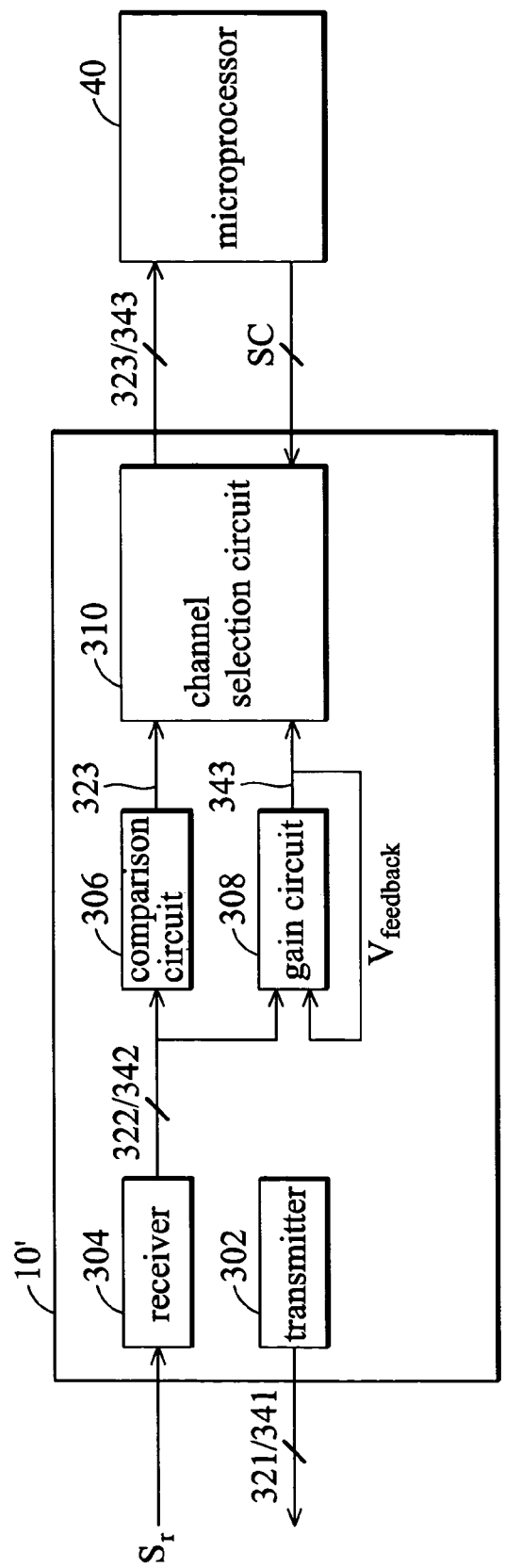
FIG. 7 is a block diagram of another embodiment of a distance measurement unit in the multifunction rangefinder.

FIG. 7 shows another embodiment of a distance measurement unit. As shown in FIG. 7, the distance measurement unit 10' comprises a transmitter 302, a receiver 304, a comparison circuit 306, a gain circuit 308 and a channel selection circuit 310. The transmitter 302 transmits pulse light beams to the target that are reflected by. The receiver 304 receives the reflected pulse light beams Sr from the target, and outputs corresponding distance signals 322/342 to the comparison circuit 306 and the gain circuit 308. In some embodiments, the pulse light beam can be a laser light beam.

Figure 8A:
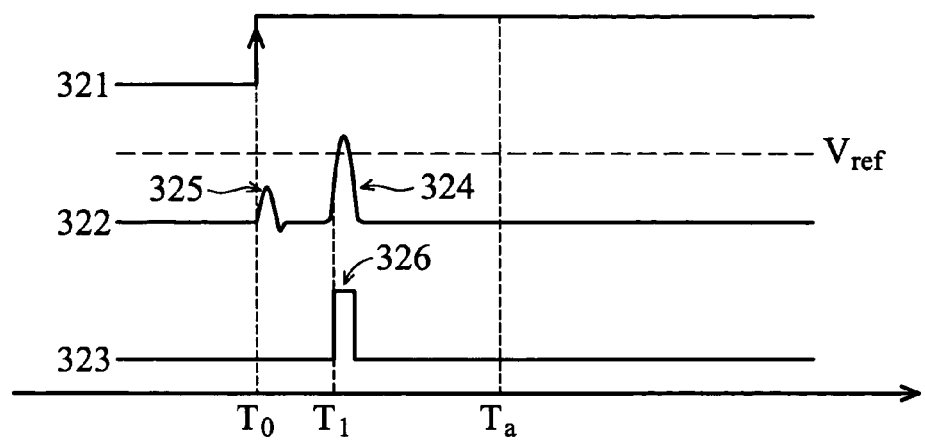
FIG. 8a is a timing chart output from the comparison circuit in the distance measurement unit of FIG. 7.

The comparison circuit 306 has a reference voltage level $V_{ref}$ slightly higher than spike noise voltage level. Spike noise is produced when a pulse signal is transmitted from the transmitter 302. Consequently, the spike noise is eliminated by the comparison circuit 306. FIG. 8a is a timing chart output from the comparison circuit 306 of FIG. 7. As shown in FIG. 8a, the signal 321 is a pulse signal transmitted to the target from the transmitter 302 at time $T_0$. The distance signal 322 has a spike noise 325 after time $T_0$. The comparison circuit 306 receives the distance signal 322 and outputs the signal 323. The signal 323 is the output wave of the comparison circuit 306 after receipt of the distance signal 322. The reflected pulse light beam maintains considerable energy intensity if the distance between the target and the rangefinder is within 30 meters. Thus, the distance signal 322 output from the receiver 304 may have a target pulse 324 higher than the reference voltage level $V_{ref}$. In the comparison circuit 306, pulses smaller than the reference voltage level $V_{ref}$ are eliminated when the distance between the target and the rangefinder 10 is within 30 meters. Consequently, the signal 323 only includes pulse 326 without spike noise 325.

Initially, the channel selection circuit 310 connects to the comparison circuit 306 such that the signal 323, as the distance measurement signal $S_1$, output from comparison circuit 306 is transferred to a microprocessor 40. Consequently, the microprocessor 40 determines whether a reflected pulse light beam is received by the receiver 304 during time $T_a$, and calculates the distance traveled by the light beam between the target and the rangefinder 100. The microprocessor 400 enables the channel selection circuit 310 to connect to the gain circuit 308 when the channel selection circuit 310 has no output or the microprocessor 40 cannot obtain the distance traveled by the light beam between the target and the multifunction rangefinder 100.

Figure 8B:
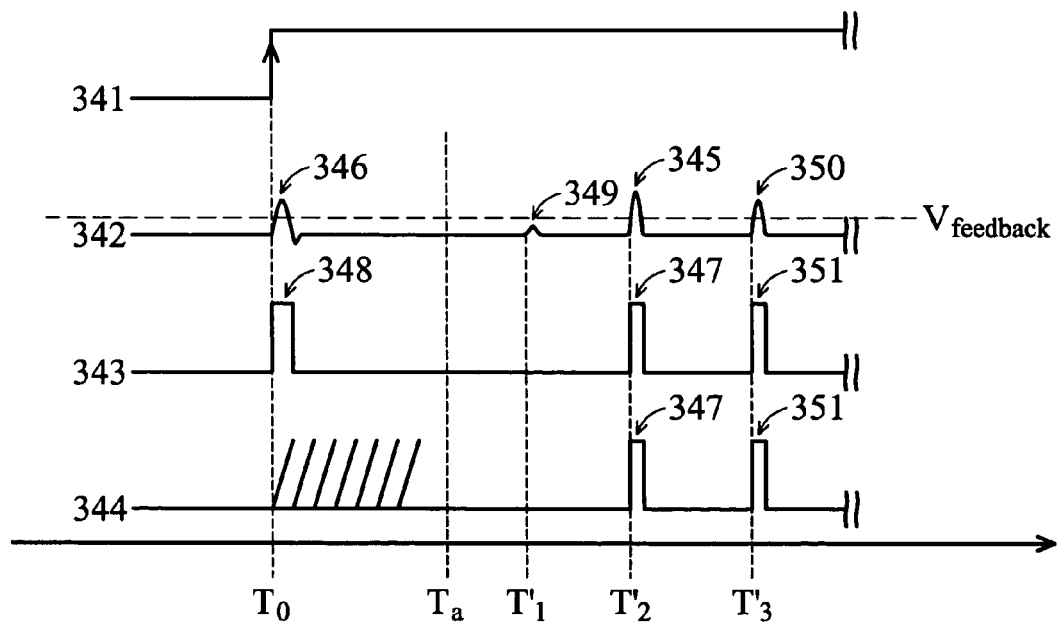
FIG. 8b is a timing chart output from the gain circuit in the distance measurement unit of FIG. 7.

The gain circuit 308 has a feedback voltage level $V_{feedback}$, wherein the feedback voltage level $V_{feedback}$ is provided from the output of the gain circuit 308, and the feedback voltage level $V_{feedback}$ is smaller than the reference voltage level $V_{ref}$. The gain circuit 308 amplifies pulses therethrough non-linearly. FIG. 8b is a timing chart output from the gain circuit 308 in the distance measurement unit 10' according to this embodiment. The travel time of pulse light between the target and the rangefinder 100 exceeds time $T_a$ when the distance between the target and the rangefinder 100 exceeds 30 meters. As shown in FIG. 8b, the signal 341 is a pulse signal transmitted to the target from the transmitter 302 at time $T_0$. The distance signal 342 has spike noise 346 in the proximity of time $T_0$, and the pulses 349, 345 and 350 occur in the distance signal sequentially at times $T'_1$, $T'_2$ and $T'_3$. The pulse 349 is eliminated by the gain circuit 308 because the peak voltage of the pulse 349 is smaller than the feedback voltage level $V_{feedback}$ when the distance signal 342 passes through the gain circuit 308. The pulses 345 and 350 and spike noise 346 are amplified non-linearly by the gain circuit 308. The gain circuit 308 receives the distance signal 342 and outputs the signal 343. Signal 343 is the output wave of the gain circuit 308 after receipt of the distance signal 342. The square waves 348, 347 and 351 are amplifications of the spike noise 346 and the pulses 345 and 350, wherein the square waves 348, 347 and 351 have the same peak voltage level. The signal 343 output from gain circuit 308 is transferred to the microprocessor 40 to calculate the distance between the target and the rangefinder. In some embodiments of the present invention, the microprocessor 40 accumulates the amplified signal 343 corresponding to the pulse light beams by statistical operation so as to distinguish between the reflected pulse light beam and environmental light. During the statistical operation, the microprocessor 40 eliminates the square wave produced before time Ta automatically, such as square wave 348, and calculates the signal 344. Thus, the microprocessor 40 calculates the distance traveled by the light beam between the target and the multifunction rangefinder 10 according to the signal 344, serving as the distance measurement signal $S_1$, from the channel selection circuit 310.

It should be noted that, while, in the above embodiments the rangefinder is operated in short distance mode when the target distance from the rangefinder is within 30 meters, the invention is not limited thereto. This distance can be adjusted by the rangefinder, and different rangefinders can define different distances from which to operate in short distance mode.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multifunction rangefinder, comprising:
   a power supply;
   a distance measurement unit capable of short and long distance measurements, coupled to the power supply to transmit a light beam to a target, receive reflected light from the target, and output a distance measurement signal;
   a compass measurement unit coupled to the power supply to measure terrestrial magnetism, generating a compass measurement signal;
   an altitude measurement unit coupled to the power supply to measure atmospheric pressure, generating an altitude measurement signal;
   a microprocessor calculating a distance between the target and the distance measurement unit and altitude according to the distance measurement signal and the altitude measurement signal respectively, and determining the direction to of the target according to the compass measurement signal; and
   a display unit coupled to the microprocessor to display the calculated distance between the target and the distance measurement unit, the calculated altitude and the determined direction to of the target, wherein the distance measurement unit comprises:
      a transmitter transmitting the light beam to the target;
      a receiver receiving the reflected light from the target and outputting a corresponding distance signal;
      a comparison/gain device receiving and processing the distance signal in a comparison mode or in a gain mode; and
      a mode switching device selectively switching between the comparison and gain modes of the comparison/gain device, wherein the comparison/gain device detects whether a pulse is higher than a reference voltage when the comparison/gain device is switched in the comparison mode by the switching device, and the comparison/gain device amplifies the distance signal to output an amplified signal when the comparison/gain device is switched in the gain mode by the mode switching device.

2. The rangefinder as claimed in claim 1, wherein the power supply comprises at least first, second and third power voltages, the microprocessor drives the power supply to power the distance measurement unit, the compass measurement unit and the altitude measurement unit selectively.

3. The rangefinder as claimed in claim 2, wherein the compass measurement unit comprises:
   a magnetic sensor measuring the terrestrial magnetism and outputting a first corresponding signal; and
   a control circuit converting the first corresponding signal to the compass measurement signal output to the microprocessor.

4. The rangefinder as claimed in claim 3, wherein the altitude measurement unit comprises:
   an atmospheric pressure sensor measuring atmospheric pressure and outputting a second corresponding signal; and
   a filter circuit filtering noise from the second corresponding signal and outputting the altitude measurement signal to the microprocessor.

5. The rangefinder as claimed in claim 4, wherein the microprocessor comprises an analog/digital converter sampling the altitude measurement signal to obtain a sampled signal, according to which the microprocessor calculates altitude.

6. The rangefinder as claimed in claim 1, wherein, in the comparison mode, pulse higher than the reference voltage detected by the comparison/gain device serves as the distance measurement signal for short distance measurement, and in the gain mode, the amplified signal serves as the distance measurement signal for long distance measurement.

7. A multifunction rangefinder, comprising:
   a power supply;
   a distance measurement unit capable of short and long distance measurements, coupled to the power supply to transmit a light beam to a target, receive reflected light from the target, and output a distance measurement signal;
   a compass measurement unit coupled to the power supply to measure terrestrial magnetism, generating a compass measurement signal;
   an altitude measurement unit coupled to the power supply to measure atmospheric pressure, generating an altitude measurement signal;
   a microprocessor calculating a distance between the target and the distance measurement unit and altitude according to the distance measurement signal and the altitude measurement signal respectively, and determining the direction to of the target according to the compass measurement signal; and
   a display unit coupled to the microprocessor to display the calculated distance between the target and the distance measurement unit, the calculated altitude and the determined direction to of the target, wherein the distance measurement unit comprises:
      a transmitter transmitting the light beam to the target;
      a receiver receiving the reflected light from the target and outputting a corresponding distance signal;
      a comparison circuit receiving the distance signal and detecting whether a pulse in the distance signal is higher than a reference voltage level; and
      a gain circuit receiving the distance signal from the receiver to amplify and output a corresponding amplified signal, wherein pulse higher than the reference voltage level serves as the distance measurement signal for short distance measurement and the amplified signal serves as the distance measurement signal for long distance measurement.

8. The rangefinder as claimed in claim 7, wherein the power supply comprises at least first, second and third power voltages, the microprocessor drives the power supply to power the distance measurement unit, the compass measurement unit and the altitude measurement unit selectively.

9. The rangefinder as claimed in claim 8, wherein the compass measurement unit comprises:
   a magnetic sensor measuring the terrestrial magnetism and outputting a first corresponding signal; and
   a control circuit converting the first corresponding signal to the compass measurement signal output to the microprocessor.

10. The rangefinder as claimed in claim 9, wherein the altitude measurement unit comprises:
    an atmospheric pressure sensor measuring atmospheric pressure and outputting a second corresponding signal; and
    a filter circuit filtering noise from the second corresponding signal and outputting the altitude measurement signal to the microprocessor.

11. The rangefinder as claimed in claim 10, wherein the microprocessor comprises an analog/digital converter sampling the altitude measurement signal to obtain a sampled signal, according to which the microprocessor calculates altitude.

* * * * *